Dec. 26, 1967          G. PRACHE          3,360,251
REVOLVING FLAME ROASTING FURNACE
Filed April 15, 1965          3 Sheets-Sheet 1
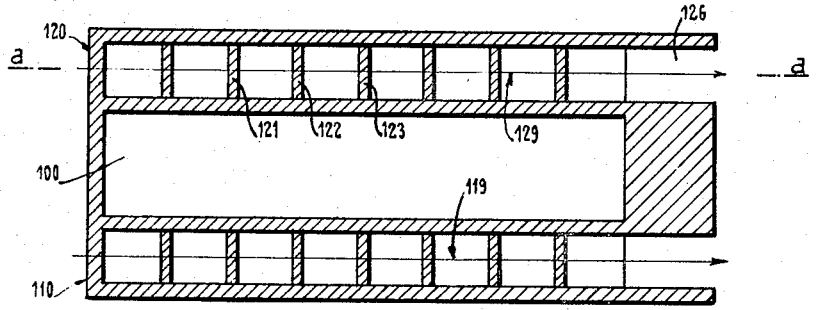
—Fig. 1— PRIOR ART
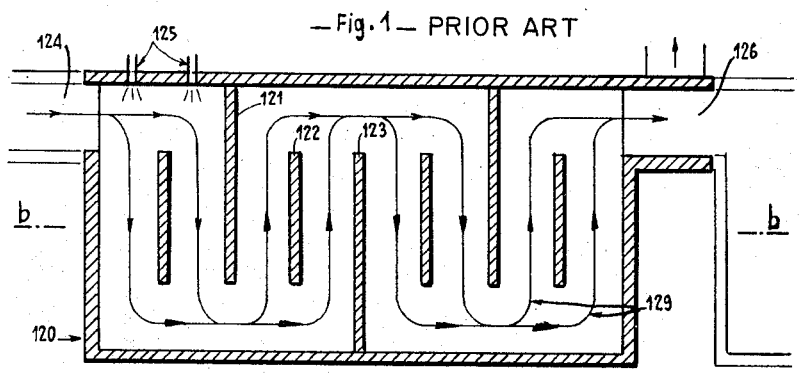
—Fig. 2— PRIOR ART
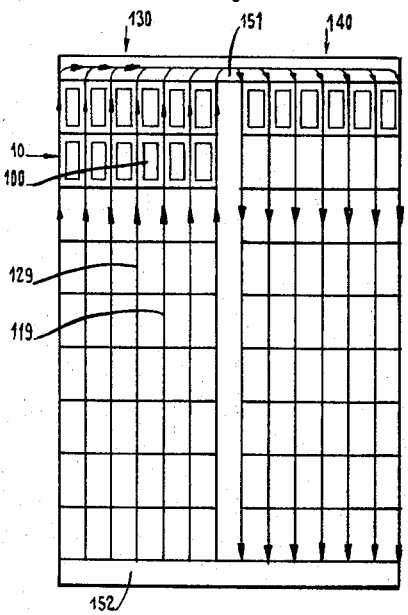
—Fig. 3— PRIOR ART
INVENTOR.
Gerard Prache
BY
McDougall, Hersh & Scott
Attys Dec. 26, 1967    G. PRACHE    3,360,251
REVOLVING FLAME ROASTING FURNACE
Filed April 15, 1965    3 Sheets-Sheet 2
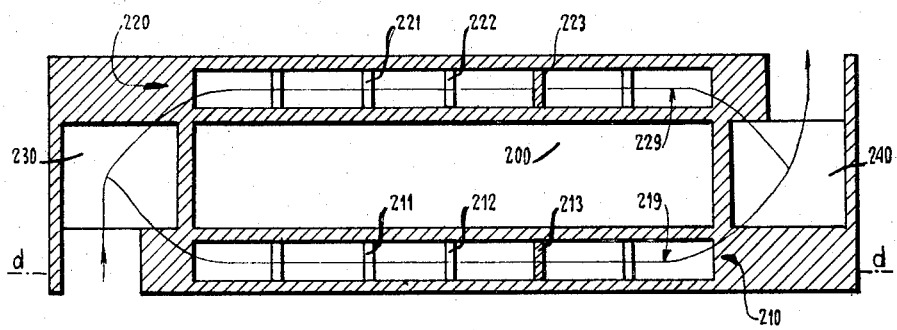
—Fig. 4—
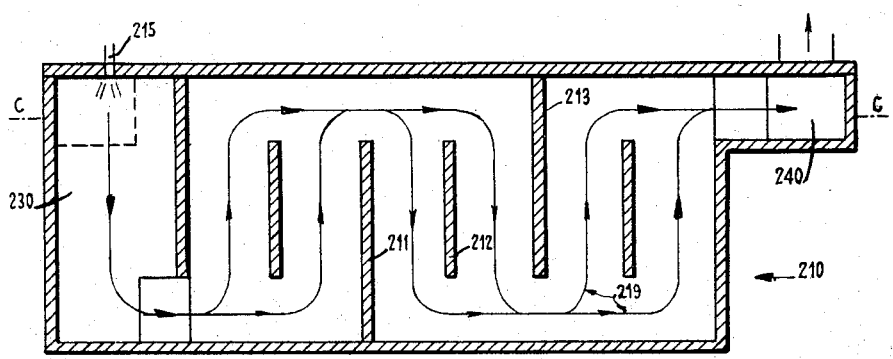
—Fig. 5—
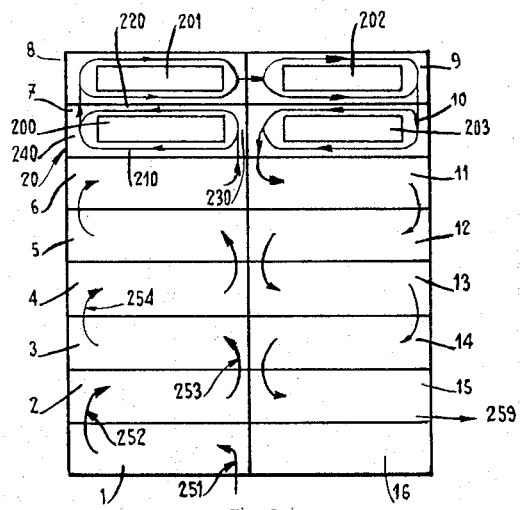
—Fig. 6—
INVENTOR.
Gerard Prache
BY
McDougall, Hersh & Scott
Attys 3,360,251
REVOLVING FLAME ROASTING FURNACE
Gerard Prache, Chedde, France, assignor to Pechiney-Compagnie de Produits Chimiques et Electrometallurgiques, Paris, France
Filed Apr. 15, 1965, Ser. No. 448,535
Claims priority, application France, May 22, 1964, 975,505
6 Claims. (Cl. 263—36)

The present invention relates to a new roasting furnace of the revolving flame type.

It is well known that products can be produced from refractory materials by mixing these materials in powder form with a binder, and shaping the paste thus obtained by known processes, such as compression in the cold in matrices, simple or centrifugal molding, or extrusion. Thereafter, the shapes are roasted or burned in a roasting furnace at a temperature which is usually between 300 and 1200° C. This burning operation may only constitute a first stage since a second operation at much higher temperatures often in excess of 2000° C., is frequently necessary.

Objects consisting of molybdenum carbide have been obtained by such procedures wherein powder of this material is mixed with a natural or artificial wax, forming a paste which sets on cooling. The paste is shaped by molding and is then sintered in two stages, the first of which consists of a burning or baking at a temperature rising regularly from 300° C. to more than 1000° C. and the second taking place at a higher temperature between 1600° C. and 2300° C.

In a similar manner, industrial graphite has been manufactured from granulated petroleum coke, which has been freed beforehand from any volatile material. This coke is mixed with a binder which is formed by suitably crushed coal tar in a mixer brought to a temperature of 100 to 150° C. The tar becomes pasty and agglomerates the coke particles, and the resulting mixture is thereafter cooled and ground to obtain an "unfired" material. This material is agglomerated by molding under pressure, by drawing, or by any other known process. The products thus obtained then undergo a baking or firing of long duration (up to several weeks) at increasing temperatures which may reach a value between 600 and 1200° C., with the exclusion of any possibility of oxidation. The object of this baking is to increase to a maximum extent the carbon content in the material by eliminating all the volatile substances contained in the binder. These volatile substances occasionally catch fire during the operation, a phenomenon constituting the "burning." Upon leaving the roasting furnace, the carbon blocks undergo the last operation, the graphitization proper, by heating in the absence of air at a temperature in the range from 2500 to 3000° C.

The roasting operation at medium temperatures, up to about 1200° C., is effected in compartments defined by heating partitions. In order to avoid any possibility of oxidation, the products to be roasted are generally embedded in a reducing material such as granulated petroleum coke. Hot gases produced in a combustion chamber circulate in the partitions.

Since the object of the roasting operation is to heat all the products contained in the furnace in accordance with a previously determined temperature-time curve, it is important that the various points of the heating partitions are at nearly the same temperature and that the temperature inside the individual compartments is as uniform as possible. Furthermore, it is desirable to reduce to a minimum the heat consumption as well as the duration of the roasting or baking cycle.

During the roasting cycle, the method of heat transmission varies. While the gases are at low temperature, the transmission is mainly by convection. As the temperature rises, the transmission by radiation becomes increasingly more significant and becomes preponderant at the end of the cycle when the temperature of the products to be roasted is at its maximum. On the other hand, the hot gases lose heat all along their path of movement and the walls of the heating partitions are cooled when they are swept by gases which have travelled a long distance since entering the furnace. It is therefore necessary to use in the furnace a current of hot gases which is introduced at a high rate of flow and at a temperature which is substantially equal to the desired temperature.

This procedure, however, results in a large rate of flow of gas being sent to the chimney, the temperature of which is close to that which it had when the gas entered the heating partitions.

As a further consideration, it is noted that the temperature of the chamber has to be higher than 900° C. to achieve significant output from the combustion of fuel oil, the fuel generally employed in such furnaces. Because of the limit of resistance of the refractory lining, the temperature must be below a limiting temperature which is generally 1300° C. During the combustion of fuel oil, carried out under the most economic conditions, fumes are produced having a temperature of about 2000° C., and it is therefore necessary to send into the combustion shaft a quantity of air which is much higher than the theoretical quantity, this resulting in a loss of a quantity of heat equal to that contained in this excess of air at the moment it is passed into the chimney.

In connection with the firing of products intended to be subjected to the graphitization operation, it is known to use discontinuous furnaces, in which the hot gases, produced in a fixed combustion shaft, circulate in the heating partitions of the firing compartments arranged in parallel and leave by way of a discharge flue. In these furnaces, the two difficulties referred to above are overcome by the artifice of recirculation. The smoke gases are taken up at the outlet from the furnace in order to be reinjected at the inlet and mixed with the hot combustion smoke gases. It is then sufficient to send to the chimney a quantity of used smoke gases which is equal to the quantity of added new gases, this quantity depending on the temperature of the new gases and the overall temperature that it is desired to achieve at the inlet to the furnace. There is thus avoided the necessity of having to send to the chimney a large gaseous flow which is formed by the gases of combustion and by the excess of air, the temperature of which is close to that which it had when the gases entered the heating partitions.

In spite of this technique, these furnaces have the serious disadvantage of having a low calorific output. Moreover, they superheat the products of the hottest compartments and they produce an overextended heating cycle and an overextended charging cycle, based on the size of the units employed.

These disadvantages are partially overcome by the use of a revolving flame furnace having multiple compartments. Such a furnace comprises an even number of chambers, each of which contains a given number of compartments in parallel along the path of the smoke gases. Each compartment is separated from the following one by a heating wall. The chambers are arranged in two rows, the smoke gases circulating in one direction in one of the rows, then reversing on themselves in order to pass through the second row in the opposite direction.

The revolving furnaces are designed to operate continuously. At any given moment, one compartment or several contiguous compartments are stopped and undergo unloading and charging. The admission of fresh air takes place at the entrance of the first compartment following these stopped compartments, while the discharge of the burnt gases occurs at the outlet of the last compartment preceding these compartments which are being unloaded and charged. Starting from the stopped compartments, an inspection of furnace conditions reveals that there are first found compartments undergoing cooling, in which the fresh air is progressively reheated. The next compartment or group is completing the roasting and is equipped with burners in action. The combustion gases emitted from this compartment pass into the adjacent compartments which are undergoing heating and are sent to the chimney at the outlet from the compartment which precedes the stopped compartments. When one cycle is completed, the compartments which have just undergone the unloading and charging operation are heated and the compartments previously undergoing cooling (those which receive the fresh air) are in their turn brought to the unloading and charging condition.

These furnaces permit a better utilization of the heat units of the combustion gases and their capacity greatly exceeds that of the discontinuous furnaces. Even in the case of a single furnace, the personnel concerned with the charging and unloading operations can be continuously kept busy thereby providing improved efficiency.

Even in the case of such revolving furnaces, disadvantages are recognized since the large units employed lack flexibility. Moreover, burning in the furnaces is difficult to control, and measures taken to avoid this problem have repercussions in the adjacent compartment. In addition, since the combustion takes place in the heating partitions, incompatibility between the combustion temperatures of the fuel oil, namely, about 1200 to 1350° C., and the roasting temperature, occurs when the latter is relatively low. The first disadvantage makes it impossible to use these furnaces for the firing of unfired products with a high tar content and intended for graphitization.

It is an object of the present invention to provide a revolving flame roasting furnace which obviates the above listed disadvantages.

It is a more particular objects of this invention to provide a revolving flame roasting furnace which has a high degree of flexibility, which permits simple control of the phenomenon of combustion of the gases escaping from the products being fired, and which permits strict control of the rise in temperature of the charge to thereby provide an excellent yield for a wide variety of applications.

These and other objects of this invention will appear hereinafter and for purposes of illustration but not of limitation, specific embodiments of this invention are shown in the accompanying drawings in which:

FIGURE 1 comprises a horizontal sectional view, taken along the line b—b of FIGURE 2, of a furnace chamber employed in prior art revolving flame furnace constructions;

FIGURE 2 is a vertical sectional view taken along the line a—a of FIGURE 1;

FIGURE 3 is a schematic illustration of a prior art furnace assembly employing chambers of the type shown in FIGURES 1 and 2;

FIGURE 4 is a horizontal sectional view taken about the line c—c of FIGURE 5 illustrating a furnace chamber of the type employed in accordance with the principles of this invention;

FIGURE 5 is a vertical sectional view taken about the line d—d of FIGURE 4;

FIGURE 6 is a schematic illustration of a furnace construction comprising an assembly of chambers of the type shown in FIGURES 4 and 5; and, FIGURE 7 is a perspective view illustrating an assembly of chambers of the type shown in FIGURES 4 and 5.

Figure 7:
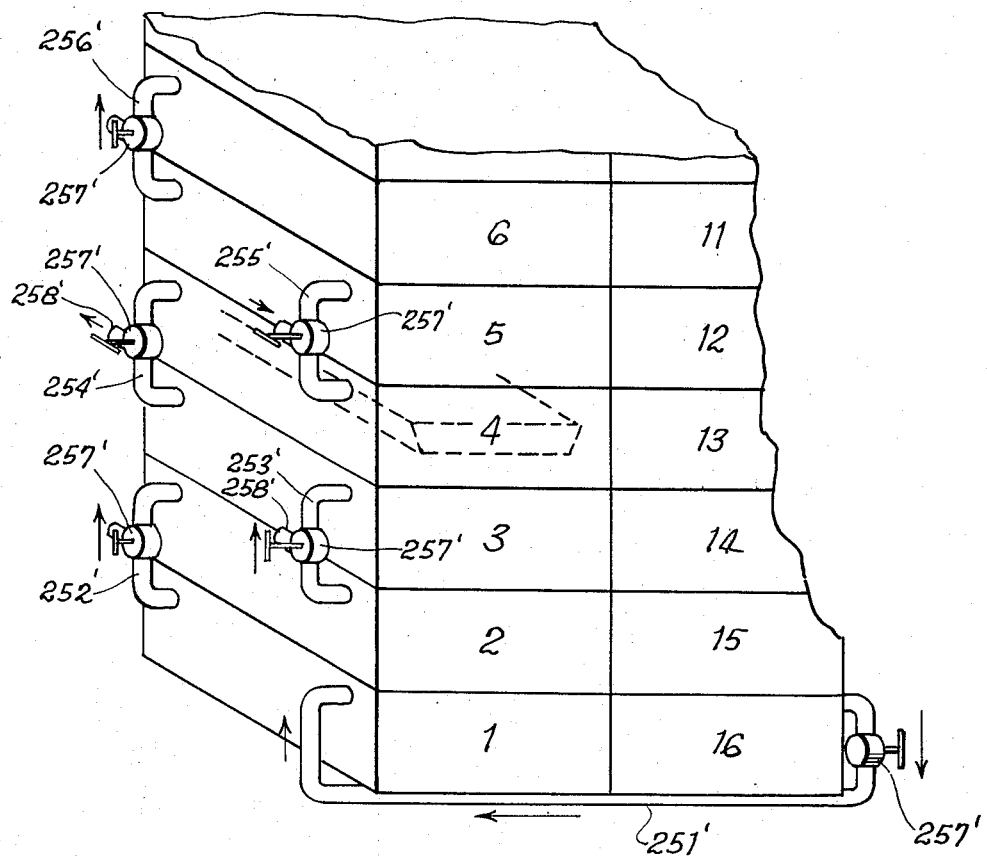

The furnace according to this invention comprises a number of roasting chambers preferably amounting to a multiple of four. The chambers are united, and each one is formed as a single compartment surrounded by two heating partitions connecting its common combustion shaft to a common discharge flue. Each partition comprises at least one baffle member for lengthening the path of the smoke gases.

The furnace shown in FIGURES 1 to 3 comprises a multi-compartmented revolving flame furnace according to the prior art. This furnace includes an even number of chambers, such as the chamber 10; each chamber comprising an arbitrary number of compartments, such as the compartment 100. The furnace shown in FIGURE 3 comprises 18 chambers each with 6 compartments.

Each compartment 100 is formed between two heating partition 110 and 120. In each compartment, baffle 121, 122, 123 improve the heat transmission by lengthening the path of the hot gases represented respectively by the arrows 119 and 129.

The hot gases originating from the corresponding compartment of the preceding chamber are brought by way of the flue 124 to the inlet to the partition 120. In the first part of this partition, fresh gases are produced by the burners 125. The outlet of the gases is by way of the discharge flue 126, which communicates with the inlet flue of the corresponding compartment of the following chamber.

Each chamber, such as 10, comprises a certain number of compartments, such as 100, arranged in parallel. The chambers are mounted in series, in two groups 130 and 140 placed side-by-side. The smoke gases leaving the first group 130 enter the second group 140 through the flue 151. Similarly, the smoke gases leaving the second group 140 pass into the first group 130 through the flue 152. The admission of the air takes places downstream of the chamber or chambers being unloaded and charged, while the air discharge takes place upstream of these chambers. It is seen that, when one of the end chambers is stopped, the circuit of the gases comprises only one of the flues 151 or 152 whereas when the end chambers are all in operation, this circuit comprises the two flues 151 and 152. This situation is one cause of irregularity in the firing procedure. This furnace also has the disadvantage of having a high calorific inertia and very little flexibility.

When the products to be fired have a high content of inflammable volatile materials, these burn in the compartments, thus causing "burnings" which are dangerous to the charge. These burnings are difficult to control and it is only possible to proceed by acting on the speed of circulation of the smoke gases. This makes it necessary to introduce lack of symmetry in the rate of flow and temperature in the partitions, and this causes a lack of symmetry in the heating of the carges of the compartments of a single chamber. The irregularities are magnified when products having a different content of volatile materials are charged into adjacent compartments of a single chamber. The firing of the crude products with a high content of tar and more generally of products of which the firing causes the emission of large quantities of combustible gases, is found to be impossible.

The charged crude products have various forms, making it desirable to have compartments of different widths. This would necessitate, however, several furnaces, which it is frequently impossible to achieve in view of the high capacity which such a furnace must have.

The charged crude or unfired products may have various grain sizes making it desirable to provide for following several different temperature-time curves. Several furnaces would, however, also be necessary to achieve this.

Finally, the temperature to which the charged products have to be heated may vary very considerably; for example, the temperature only reaches 600° C. in the case of products intended to be graphitized. On the other hand, in order to insure a good combustion of the fuel oil, the partitions under full heat have to be at a temperature in the order of 1200° C., and it is difficult to reconcile such temperature extremes.

It would be possible to provide several smaller furnaces, which would comprise only two or three compartments per chamber, in order to replace a large unit. However, the problems of the burning and the combustion temperature would still remain and there would be the additional disadvantage of a lower yield resulting from relatively larger thermal losses at the periphery of the furnace.

In order to provide a solution for all of these problems, the instant invention provides for the reduction of the number of compartments per chamber to one. In order to close the circuit of the smoke gases, the number of chambers is a multiple of four, and the chambers are connected along their largest dimension.

The furnace shown in FIGURES 4 to 6 is characterized by the features of this invention and comprises sixteen chambers 20, each chamber comprising a single cell 200, the width of which corresponds to an optimum filling coefficient for a certain range of products.

Each cell 200 is enclosed by two heating partitions 210 and 220, connecting a common combustion shaft 230 to a common discharge flue 240. In each partition, baffles such as 211, 212, 213 and 221, 222, 223, improve the heat transmission by lengthening the path of the hot gases and by regulating the circulation along the assembly wall. The combustion shaft comprises at least one burner such as 215. The path of the hot gases in each of the partitions is shown respectively by the arrows 219 and 229. In such a compartment, the materials forming the partitions are only required to withstand a temperature which is lower than that which the partitions 110 and 120 of the multi-compartment furnace would have to withstand, for example, 1000° C. instead of 1200° C. Finally, the compartments are reversed relatively to one another, in order to provide the furnace with an overall symmetry and to reduce to a minimum the heat losses at the periphery of the furnace.

The furnace provides two series of chambers disposed with their large surfaces against one another, the two series being connected so that the small surfaces of the chambers of the first series are against those of the second series. This enables the furnace assembly to be given a length and a width of approximately the same dimensions, so that the external surface of the furnace, of which the heat losses are a function, can be as small as possible with respect to the effective surface.

In order to better understand the operation of the furnace, an example of the operation of a particular furnace having 16 compartments, is shown in FIGURE 6. The chambers are numbered, for the series on the right, from 1 to 8 and from bottom to top, while the chambers of the series on the left are numbered from 9 to 16 from top to bottom.

At each instant, there is one stopped chamber or several stopped contiguous chambers undergoing unloading and charging. In the examples, it is assumed that this is the case with the chamber 16 at the time in question.

The fresh air enters the chamber 1 through the lower side, following the arrow 251. The chamber 1 is at this moment completing the cooling. It will be understood that any appropriate opening and closing means for the several chambers may be employed.

The air passes from the chamber 1 to the chamber 2 through a flue placed alongside the outside wall and following the arrow 252, and then passes from the chamber 2 to the chamber 3 through a flue situated on the inside, following the arrow 252. As the flow proceeds in this manner, these chambers, which are undergoing cooling, are increasingly hotter. The air is thus progressively heated and reaches the chamber which is at the end of firing or roasting, that is to say, the chamber 7 for example. This air enters the combustion shaft 230 of this chamber, which is provided with at least one burner 215, and it serves therein as a supporter of combustion. The combustion gases and the air in excess then flow through the chambers undergoing heating, namely 8 and those which follow, which chambers may or may not be equipped with burners, depending on the shape of the desired "temperature-time" curve. The spent smoke gases are extracted by suction through the outlet flue of the last chamber undergoing heating, namely 15, following the arrow 259, and are sent to the chimney.

After a given time, the chamber 16 is recharged with products to be fired, and is again heated. The smoke gases discharged from the chamber 15 are conducted thereto and are only sent to the chimney at the outlet of the chamber 16, while the chamber 1 is in its turn stopped in order to undergo the operation of unloading and charging. The fresh air is then injected at the inlet of the chamber 2 on completion of the cooling. The chamber 7 is positioned for commencing the cooling with the burners thereof being withdrawn from their combustion shafts, or otherwise rendered inoperative, for movement of the burning to the shafts of the chamber 8 which contains the materials reaching the completion of the firing.

FIGURE 7 provides a further illustration of the operation of the invention. In this figure, the chambers are interconected by means of conduits 251' through 256'. Valves 257' are adapted to be operated whereby one position of the valves will provide for flow through the conduits from one chamber to the next. The other positions provided for the valves will provide for passage of air to the atmosphere or for ingress of air, in each case through the short pipe 258' associated with each valve. Conventional three-way valves can, of course, be employed.

In the condition of the furnace shown in FIGURE 7, the intermediate chamber 4 is stopped. Since the chamber 16 is back in the circuit, air flowing through the conduit 251' passes directly into the chamber 1, through this chamber, and then out through conduit 252' to the chamber 2. The air passes through the chamber 2 into conduit 253', through the chamber 3 and into conduit 254'. Since the chamber 4 is stopped, the air from chamber 3 passes directly to the atmosphere. Similarly, atmospheric air is drawn into the conduit 255' for passage into the chamber 5.

When the chamber 4 is re-charged, the chamber 5 will then become the stopped chamber. To accomplish this, air from the conduit 254' is now directed into the chamber 4, through the chamber, and to the conduit 255'. This air is discharged to the atmosphere while atmospheric air is drawn into the chamber 6 through conduit 256'.

The operation is such that the path of the smoke gases remains the same, irrespective of the chamber which is stopped, because of the omission of the flues 151 and 152 for collecting the smoke gases.

Some advantages of the "folded up" furnace with single-compartment chambers can be enumerated as follows:

Ideal control of the "burning," because of the existence of a single smoke gas circuit and its arrangement in parallel in several compartments thereby permitting the firing of products which emit a large quantity of combustible gases;

Improved filling coefficient, because of the possibility of using multiple units with a small number of chambers without loss of heat yield;

Strict control of the rise in temperature of the charge, facilitated by the fact that individual control is provided;

Improvement in the combustion conditions, which occur outside the heating partitions, in the chambers of which the upper part forms the combustion chamber proper, the lower part forming a chamber for mixing gases of combustion with the cooled gases originating from the preceding compartment;

Identical thermal conditions in all the compartments, because of the pressure drops throughout the length of the circuit. This is due to the complete symmetry of the furnace and particularly to the omission of the end flues 151 and 152 of the multi-compartment furnace, which disturb the rates of flow and consequently the temperatures of the smoke gases;

Ease of handling the relatively small charge of the single compartment of each chamber.

By way of example, a single multi-compartment furnace having an area of 660 square meters and yielding annually 16,000 tons of discharged products, is replaced by several sinuous single-compartment furnaces with an area of 270 square meters, each supplying 7200 tons of products per year. The increase in yield of products from the furnace per unit of area is obvious and, in addition, the sinuous single-compartment furnace is used for the baking of crude or unfired products with a high content of tar which are intended for graphitization, which could not be achieved with the multi-compartment furnace.

Furthermore, if the "folded up" single-compartment furnace is compared with a discontinuous furnace capable of carrying out the firing of the same products with a high tar content, it is found that the specific consumption of fuel oil changes from 280 kg. per discharge ton to less than 150 kg.

It will be understood that various changes and modifications may be made in the furnace construction described which provide the characteristics of this invention without departing from the spirit thereof particularly as defined in the following claims.

That which is claimed is:

1. A revolving frame roasting furnace comprising a plurality of separate roasting chambers, each of said chambers being rectangular in shape to thereby define large surfaces on their side walls and smaller surfaces at their ends, the chambers being disposed in at least two rows, each of said rows comprising the same number of chambers with said larger surfaces of adjacent chambers in a particular row being disposed in contact with each other and with said smaller surfaces of the chambers of one row being in contact with the smaller surfaces of the chambers of the other row, the assembly of said chambers defining a large rectangular configuration with each chamber in the assembly being located between two adjacent chambers, each of said chambers defining a single roasting compartment, heating partitions surrounding said compartment, a combustion shaft and an admission flue common to the heating partitions of each chamber and located at one end of said partitions, and a discharge flue common to the heating partitions of each chamber located at the other end of said partitions whereby the partitions of each chamber interconnect the flues of that chamber, the respective flues of the adjacent chambers being interconnected whereby a gas flow circuit is provided throughout the furnace, means for individually closing each of said chambers with respect to said circuit for unloading and recharging of a chamber, an inlet opening and an exhaust opening for each of said chambers, and means for selectively opening and closing said inlets and exhausts with respect to the outside atmosphere.

2. A furnace in accordance with claim 1 wherein the ends of adjacent chambers in a row are reversed with respect to each other whereby the admission flues of the chambers are disposed opposite the discharge flues of adjacent chambers.

3. A furnace in accordance with claim 1 wherein the number of said chambers comprises a multiple of four.

4. A furnace in accordance with claim 1 wherein each of said partitions comprises at least one baffle for thereby lengthening the path of the gases passing therethrough.

5. A method for the roasting of material in a furnace of the type described in claim 1 comprising the steps of closing off at least one of said chambers, charging said chamber with said material, admitting fresh gas to the inlet opening of an inlet chamber situated immediately downstream of said one chamber, removing spent gas from the exhaust opening of an exhaust chamber situated immediately upstream of said one chamber, and providing combustion of said gas in a chamber disposed in the path of movement of the gas between the inlet chamber and the exhaust chamber.

6. A method in accordance with claim 5 including the steps of closing off said inlet chamber after completion of combustion for unloading of the material therein and for recharging thereof, utilizing the chamber immediately downstream of said inlet chamber for introduction of additional gas, opening said one chamber and utilizing said one chamber for exhaust of spent gas, and thereafter continuously shifting the respective chambers in the same fashion after each combustion.

References Cited

UNITED STATES PATENTS

| | | | |
|---|---|---|---|
| 1,170,313 | 2/1916 | Nagelschmitz | 264—29 |
| 2,699,931 | 1/1955 | Buhler et al. | 263—36 |
| 3,048,382 | 8/1962 | Mansfield | 263—41 |

FREDERICK L. MATTESON, Jr., *Primary Examiner.*

JOHN J. CAMBY, *Examiner.*